US008200517B2

United States Patent
Sakamoto et al.

(10) Patent No.: US 8,200,517 B2
(45) Date of Patent: Jun. 12, 2012

(54) USER ACTIVITY ESTIMATION SYSTEM AND A USER ACTIVITY ESTIMATING METHOD

(75) Inventors: Kenji Sakamoto, Yokosuka (JP); Naoharu Yamada, Yokohama (JP); Goro Kunito, Yokosuka (JP); Satoshi Tanaka, Yokohama (JP); Kenichi Yamazaki, Hino (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 1250 days.

(21) Appl. No.: 11/497,272

(22) Filed: Aug. 2, 2006

(65) Prior Publication Data

US 2007/0033083 A1 Feb. 8, 2007

(30) Foreign Application Priority Data

Aug. 4, 2005 (JP) ................................ 2005-226671

(51) Int. Cl.
*G06Q 10/00* (2012.01)
(52) U.S. Cl. .................................... 705/7.11
(58) Field of Classification Search ........................ None
See application file for complete search history.

(56) References Cited

U.S. PATENT DOCUMENTS

| | | | |
|---|---|---|---|
| 4,942,526 A * | 7/1990 | Okajima et al. | 704/10 |
| 6,032,127 A * | 2/2000 | Schkolnick et al. | 705/23 |
| 6,182,070 B1 * | 1/2001 | Megiddo et al. | 707/694 |
| 6,189,005 B1 * | 2/2001 | Chakrabarti et al. | 1/1 |
| 6,226,634 B1 * | 5/2001 | Ogihara et al. | 1/1 |
| 6,655,963 B1 * | 12/2003 | Horvitz et al. | 434/236 |
| 6,659,344 B2 * | 12/2003 | Otto et al. | 235/381 |
| 6,810,376 B1 * | 10/2004 | Guan et al. | 704/9 |
| 6,912,505 B2 * | 6/2005 | Linden et al. | 705/14.53 |

(Continued)

FOREIGN PATENT DOCUMENTS

JP 2003-256648 A 9/2003

(Continued)

OTHER PUBLICATIONS

Ueda N and Saito K (2002). Single-shot Detection of Multiple Categories of Text using Parametric Mixture Models. ACM. 626-631.*

(Continued)

*Primary Examiner* — Romain Jeanty
*Assistant Examiner* — Brett Feeney
(74) *Attorney, Agent, or Firm* — Crowell & Moring LLP (57) ABSTRACT

A noun and a verb is mapped as the information about an article to which an article identifier such as a radio tag, etc. is attached and a user activity, thereby estimating a user activity from the article to which the article identifier is attached and providing a user with appropriate information. An article identifier for identification of an article is associated with article information and stored (step S202), and the relationship between a noun relating to the article information and a verb relating to the article are associated with a conditional probability and held in the probability information holding unit (step S207). Upon detection of the article identifier, the probability of the verb to the noun is calculated based on the contents held in the probability information holding unit, thereby estimating a user activity (step S212). Thus, based on the detection result of the article identifier attached to the article, the activity of the user on the article can be estimated. As a result, an appropriate service can be provided for the activity of the user.

5 Claims, 9 Drawing Sheets

U.S. PATENT DOCUMENTS

| | | | |
|---|---|---|---|
| 6,963,850 B1* | 11/2005 | Bezos et al. | 705/7.29 |
| 6,976,000 B1* | 12/2005 | Manganaris et al. | 705/7.33 |
| 7,089,216 B2* | 8/2006 | Van Overveld | 706/12 |
| 7,151,453 B2* | 12/2006 | Ebert | 340/572.1 |
| 7,181,438 B1* | 2/2007 | Szabo | 1/1 |
| 7,254,552 B2* | 8/2007 | Bezos et al. | 705/26.44 |
| 7,260,553 B2* | 8/2007 | Ebert | 705/22 |
| 7,286,157 B2* | 10/2007 | Buehler | 348/143 |
| 7,680,685 B2* | 3/2010 | Ouimet et al. | 705/7.31 |
| 7,925,974 B1* | 4/2011 | McConnell et al. | 715/256 |
| 8,020,104 B2* | 9/2011 | Robarts et al. | 715/744 |
| 2002/0107853 A1* | 8/2002 | Hofmann et al. | 707/7 |
| 2002/0123882 A1* | 9/2002 | Mohammed | 704/10 |
| 2003/0083861 A1* | 5/2003 | Weise | 704/9 |
| 2003/0144985 A1* | 7/2003 | Ebert | 707/1 |
| 2005/0159996 A1* | 7/2005 | Lazarus et al. | 705/10 |
| 2005/0203870 A1* | 9/2005 | Yamada et al. | 707/1 |
| 2005/0261987 A1* | 11/2005 | Bezos et al. | 705/27 |
| 2005/0273376 A1* | 12/2005 | Ouimet et al. | 705/10 |
| 2005/0273377 A1* | 12/2005 | Ouimet et al. | 705/10 |
| 2005/0278164 A1* | 12/2005 | Hudson et al. | 704/4 |
| 2006/0095281 A1* | 5/2006 | Chickering et al. | 705/1 |
| 2006/0106709 A1* | 5/2006 | Chickering et al. | 705/37 |
| 2006/0208070 A1* | 9/2006 | Kato et al. | 235/383 |
| 2006/0271441 A1* | 11/2006 | Mueller et al. | 705/14 |

FOREIGN PATENT DOCUMENTS

| | | |
|---|---|---|
| JP | 2004-206590 A | 7/2004 |
| JP | 2004-227208 A | 8/2004 |
| JP | 2005-018166 A | 1/2005 |

OTHER PUBLICATIONS

D. Zhang, T. Gu, X. Wang (2005). Enabling context-aware smart home with semantic technology International Journal of Human-friendly Welfare Robotic Systems, 6 (4): 12-20.*

Donald Patterson and Kenneth P. Fishkin and Mike Perkowitz and Mike Perkowitz and Matthai Philipose and Matthai Philipose and Donald J. Patterson and Kenneth Fishkin (2004). Mining models of human activities from the web. Proceedings of the Thirteenth International World Wide Web Conference. 573-582.*

Kenji Sakamoto, et al., "A Discovery Method of Service Receiver Based on Relationship between Object and Person", Network Laboratories, NTT DoCoMo, Inc., IPSJ SIG Technical Report, Apr. 23, 2004, vol. 2004, No. 39, pp. 23-28, 8 total pages.

Kanji Sakamoto, et al., "Description Method of Physical-world Model for Environment Perceptive Service", Network Laboratories, NTT DoCoMo, Inc., IPSJ SIG Technical Report, Nov. 10, 2004, vol. 2004, No. 112, pp. 45-50, total 8 pages.

Naoharu Yamada, et al., "Inference of Users' Situation using Semantics of Field", Network Laboratories, NTT DoCoMo, Inc., Technical Report of IEICE, Institute of Electronics, Information and Communication Engineers (IEICE), May 6, 2004, vol. 104, No. 37, pp. 19-24, 8 total pages.

Goro Kunito, et al., "A Software Architecture for Providing Services in Ubiquitous Computing Environment", Network Laboratories, NTT DoCoMo, Inc., Technical Report of IEICE, Institute of Electronics, Information and Communication Engineers (IEICE), Dec. 10, 2004, vol. 104, No. 524, pp. 49-54, 8 total pages.

Japanese Office Action w/translation, dated Mar. 29, 2011, 8 pages.

Yasushi Nakauchi, "Human Behavior Recognition in Intelligent Environments and Support by Mobile Robot", IEICE, Jul. 22, 2005, vol. 105, No. 220, pp. 23-28, 10 total pages.

Koji Kitamura, et al., "Probabilistic Behavior Model of Preventing Infant Accident", IEICE, Oct. 11, 2004, vol. 104, No. 348, pp. 49-54, 8 total pages.

Japanese Office Action w/Translation, dated Jul. 20, 2010, 9 pages.

* cited by examiner

FIG. 3

| VERB | NOUN | CONDITIONAL PROBABILITY | NUMBER OF TYPES OF VERBS |
|---|---|---|---|
| put | jacket | 0.037 | 9 |
| | detergent | 0.002 | |
| wash | detergent | 0.017 | |
| | dish | 0.086 | |
| clean | detergent | 0.008 | |
| | dish | 0.012 | |
| wear | jacket | 0.014 | |
| keep | jacket | 0.004 | |
| understand | jacket | 0.001 | |
| add | detergent | 0.012 | |
| dry | dish | 0.035 | |
| serve | dish | 0.025 | |

USER ACTIVITY ESTIMATION SYSTEM AND A USER ACTIVITY ESTIMATING METHOD

BACKGROUND OF THE INVENTION

1. Field of the Invention

The present invention relates to a user activity estimation system and a user activity estimating method, and more specifically to a user activity estimation system and a user activity estimating method for estimating user activity from the relationship between the noun and the verb relating to an article to which an identifier is attached using a radio tag, etc.

2. Description of the Related Art

Conventionally, some methods for estimating the activity of a user using a position information and a user model have been proposed.

For example, a system of estimating the activity of a user from the relative position of a user to an article and the activity history has been disclosed (for example, refer to JP2003-256648A). Also, an apparatus for determining the activity of a user based on an estimation of the activity of a person using a user model has been disclosed (for example, refer to JP2004-227208A).

Furthermore, a method for learning a necessary article for activity, and estimating the activity of a user from the information of an article around the user has been disclosed (for example, refer to Mike Perkowitz et al., "Mining Models of Human Activities from the Web" Proceedings International WWW Conference, 2004, pp. 573-582).

SUMMARY OF THE INVENTION

The above-mentioned conventional technologies estimate uniquely estimate that an article to which a radio tag is attached is used based on the relative position between the article to which the radio tag is attached and a user, and a candidate for the activity of a user relating to the article cannot be estimated. For example, for a "dish", setting a dish can be estimated, and dish washing can also be estimated.

Furthermore, using a user model, the activity of a user can be estimated from the activity of a target person, but it is difficult to estimate based on an article what a target person is going to do.

Furthermore, to estimate the user activity from the information about an article around a user, a necessary article for an activity is learned. However, since the learning is performed according to the information about an article described in the entire document, it has been difficult to estimate a user activity on an article with high accuracy. Additionally, since there is no system of obtaining the feedback from a user in response to an estimation result, there is the possibility that an insignificant service can be provided when the estimation result is different from the situation of the reality.

The present invention has been developed to solve the problem with the above-mentioned conventional technology, and the advantage of the present invention is to realize a user activity estimation system and a user activity estimating method capable of mapping a noun and a verb as the information about an article to which a radio tag is attached and a user activity, thereby estimating a user activity from the article to which the radio tag is attached and providing a user with appropriate information.

The user activity estimation system according to claim 1 of the present invention estimates a user activity from an article to which an article identifier for identification of an article is attached, and includes: attribute information holding means for holding the article identifier associated with article information; probability information holding means for holding a relationship between a noun relating to the article information and a verb relating to the article associated with a conditional probability; and activity estimation means for estimating a user activity upon detection of the article identifier based on the contents held in the probability information holding means. With the above-mentioned configuration, based on the detection result of an identifier attached to an article, the activity of a user on the article can be estimated. Therefore, an appropriate service can be offered depending on the activity of the user.

The user activity estimation system according to claim 2 is based on claim 1 of the present invention, and further includes learning means for learning a relationship between the noun and the verb relating to the user activity, and the probability information holding means holds a learning result of the learning means. With the configuration, the contents of the probability information holding means can be updated depending on a learning result, thereby enhancing the accuracy of the estimation on a user activity.

The user activity estimation system according to claim 3 is based on claim 1 or 2, and the activity estimation means replaces the noun with information about an article corresponding to the article identifier, and replaces the verb with a user activity, thereby obtaining a relationship between the information about the article and the user activity on the article from the relationship between the noun and the verb, and estimating a user activity based on detecting result of article to which an article identifier is attached. With the configuration, a noun and a verb in a sentence, etc. can be mapped as article information and a user activity in the reality to obtain the relationship between the noun and the verb. Thus, a conditional probability based on the situation of the reality can be calculated.

The user activity estimation system according to claim 4 of the present invention is based on any one of claims 1 to 3, and when a plurality of article identifiers are detected, the activity estimation means totalizes the conditional probability, and estimates a user activity based on a totalizing result. With the configuration, the estimation probability of a user activity can be further enhanced.

The user activity estimation system according to claim 5 of the present invention is based on any one of claims 1 to 4, and further includes user interaction means for communication with a user, and the contents of the probability information holding means are changed based on a result of selection by a user on the contents presented by the user interaction means. With the configuration, since the contents of the probability information holding means can be updated depending on the selection result of a user, the estimation probability of a user activity can be further enhanced.

The user activity estimating method according to claim 6 of the present invention estimates a user activity from an article to which an article identifier for identification of an article is attached, and includes: an attribute information holding step of holding the article identifier associated with article information; a probability information holding step of holding a relationship between a noun relating to the article information and a verb relating to the article associated with a conditional probability; and an activity estimating step of estimating a user activity upon detection of the article identifier based on the contents held in the probability information holding means. With the method, based on the detection result of the identifier attached to the article, the user activity on the article can be estimated. Therefore, an appropriate service can be offered depending on the activity of the user. Furthermore, a user activity can be estimated in a less expensive system without using an expensive device such as a sensor attached to a user.

The user activity estimating method according to claim 7 of the present invention estimates a user activity from an article to which an article identifier for identification of an article is attached, and includes: an attribute information holding step of holding the article identifier associated with article information; a probability information holding step of holding a relationship between a noun relating to the article information and a verb relating to the article associated with a conditional probability; a learning step of holding a result of learning a relationship between the noun and the verb relating to a user activity; and an activity estimating step of estimating a user activity upon detection of the article identifier based on the contents held in the probability information holding means. With the configuration, wince the contents of the probability information holding means can be updated depending on the learning result, the estimation probability of a user activity can be enhanced.

As described above, the present invention has the effect of providing a user activity estimation system and method for providing an appropriate service depending on the estimation result by estimating from the detection result of an identifier attached to an article any activity of a user on the article.

DETAILED DESCRIPTION OF THE PREFERRED EMBODIMENTS

The mode for embodying the present invention is described below by referring to the attached drawings. In the following descriptions of the drawings, the same or similar components are assigned the same or similar reference numerals. However, note that the drawings are schematic charts.

(User Activity Estimation System)

Figure 1:
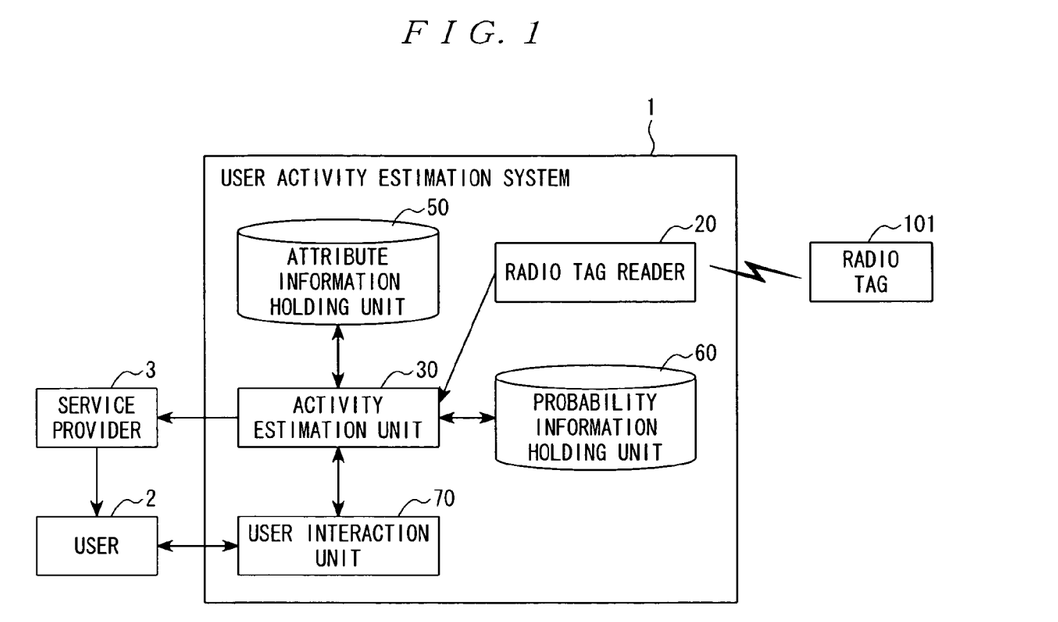
FIG. 1 is a block diagram showing an example of the configuration of a user activity estimation system according to a mode for embodying the present invention.

FIG. 1 is a block diagram showing an example of the configuration of a user activity estimation system according to a mode for embodying the present invention. In FIG. 1, a user activity estimation system 1 according to the mode for embodying the present invention is constituted by including: an attribute information holding unit 50 for associating a radio tag identifier with the information about an article to which the identifier is attached and holding the identifier; a probability information holding unit 60 for holding the conditional probability of a noun to a verb and the number of types of verbs; a radio tag reader 20 for detecting a radio tag identifier (hereinafter referred to as a radio tag ID) from a radio tag 101 attached to an article; an activity estimation unit 30 for acquiring the information about an article corresponding to the radio tag ID from the attribute information holding unit 50, acquiring the conditional probability of a noun equivalent to the information about the corresponding article to all verbs from the probability information holding unit 60, and estimating the activity of a user; and a user interaction unit 70 for communicating information with a user 2. It is also possible to provide information from the activity estimation unit 30 to a service provider 3, and to provide a service from the service provider 3 to the user 2.

(Radio Tag and Radio Tag Reader)

The user activity estimation system 1 according to the mode for embodying the present invention estimates the activity of a user based on a detection result of the radio tag ID attached to an article. The radio tag 101 is formed by, for example, an RF-ID (radio frequency identification), etc., and holds a radio tag ID for unique identification of a radio tag. Then, a transmission signal of a frequency depending on the radio tag ID is transmitted to a reader through a transmission antenna at a predetermined interval depending on the radio tag ID.

Article identification means can be a unit other than a radio tag and a radio tag reader. For example, any article identification means such as a bar code, an QR code, etc. and its reader can be used.

(Attribute Information Holding Unit)

Figure 2:
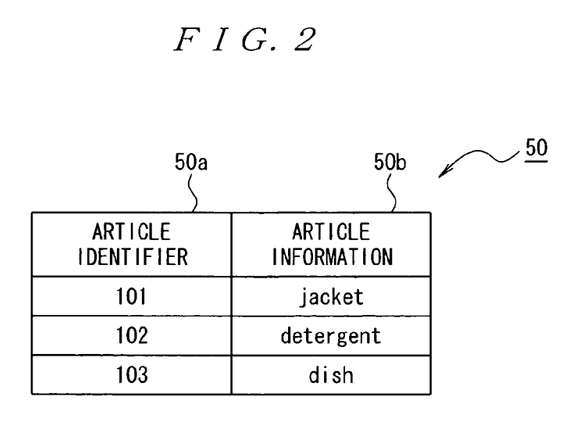
FIG. 2 shows an example of the configuration of the attribute information holding unit shown in FIG. 1.

FIG. 2 shows an example of the configuration of the attribute information holding unit 50 shown in FIG. 1. As shown in FIG. 2, the attribute information holding unit 50 associates an article identifier such as a radio tag ID, etc. with the information about the article to which the identifier is attached, holds it, and functions as an attribute database. Practically, the attribute information holding unit 50 includes an area 50a storing article identifiers such as "101", "102", "103", etc., and an area 50b storing the information about an article to which the identifier such as "jacket", "detergent", "disk", etc. is attached.

The information about an article is the title (name) of an article, the position of an article, the role of an article, etc.

(Probability Information Holding Unit)

Figure 3:
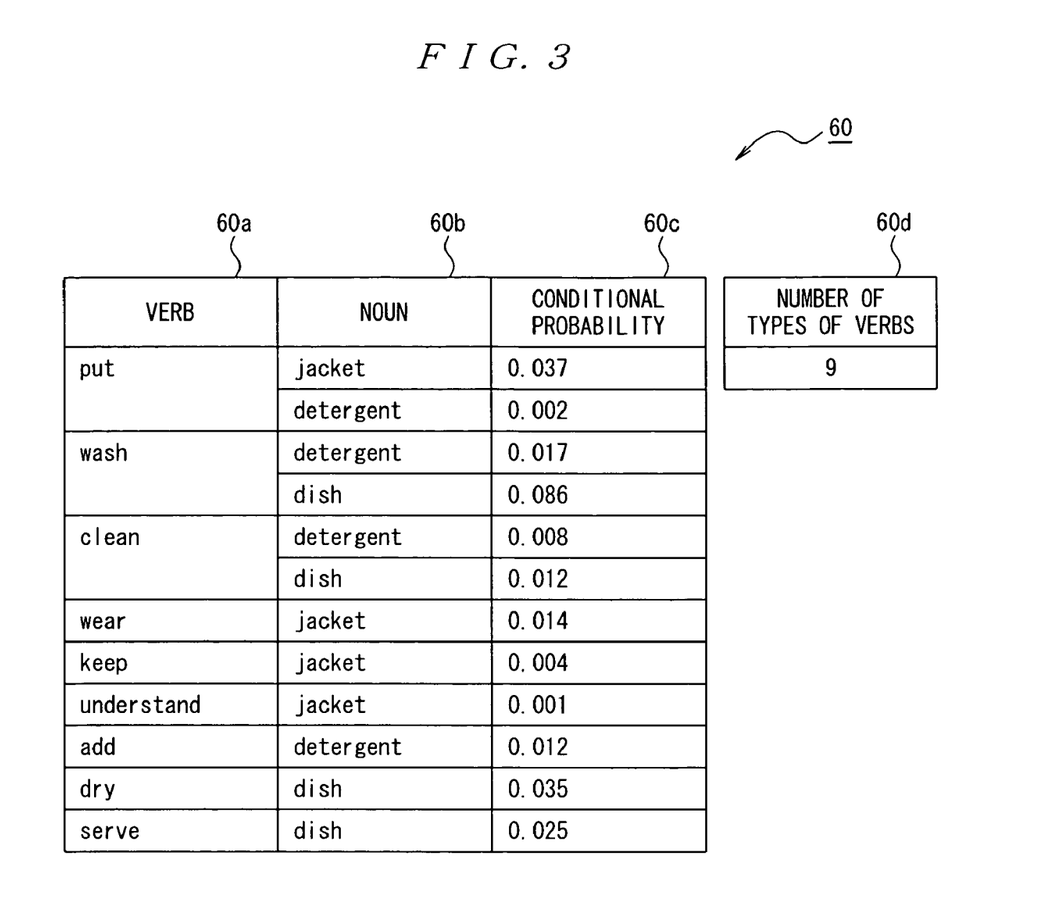
FIG. 3 shows an example of the configuration of the probability information holding unit shown in FIG. 1.

FIG. 3 shows an example of the configuration of the probability information holding unit 60 shown in FIG. 1. As shown in FIG. 3, the probability information holding unit 60 holds the conditional probability of a noun to a verb and the number of types of verbs, and functions as a learning database. Practically, the probability information holding unit 60 includes an area 60a storing verbs such as "put", "wash", "clean", "wear", "keep", "understand", "add", "dry", "serve", etc., an area 60b storing nouns such as "jacket", "detergent", "dish", etc., an area 60c storing a value of a conditional probability by combining a verb with a noun, and an area 60d storing the number of types ("9" according to the present embodiment) of verbs stored in the area 60a.

The values of the verb, noun, and probability held in the areas 60a, 60b, and 60c of the probability information holding unit 60 can be amended by adding, deleting, etc. with the correspondence among the three items maintained. The items can be assigned by a user manually inputting them, or automatically setting them from other portion in the system.

Furthermore, the conditional probability held in the probability information holding unit 60 can be adaptively changed depending on the result of the feedback from a user. Practically, when an estimation result is presented to a user through the user interaction unit 70 and the activity estimation unit 30 receives a selection result of the user, the conditional probability held in the probability information holding unit 60 is changed based on the received selection result. Thus, by reflecting the feedback from a user by the conditional probability, an activity can be estimated depending on the situation with higher accuracy.

(Activity Estimation Unit)

When the activity estimation unit 30 receives a radio tag ID attached to an article from the radio tag reader 20, it issues an inquiry to the attribute information holding unit 50, and acquires the information about the article corresponding to the radio tag ID. Then, the conditional probability of a noun equivalent to the information about the article corresponding to all verbs are acquired from the probability information holding unit 60, and the verb corresponding to the noun equivalent to the article information is calculated based on the Bayes' theorem described below. The Bayes' theorem is expressed by $$P(\text{verb } v|\text{noun } n) \propto 1/(\text{number of types of verbs})P(\text{noun } n|\text{verb } v)$$

where P(B|A) refers to the probability of B under the condition A.

The activity estimation unit 30 estimates based on a calculated result that it is more likely that a user performs an activity corresponding to a verb having a higher value. That is, a noun and a verb are associated with the article information in the reality and a user activity. Thus, the activity of a user on an article can be estimated from the relationship between the noun and the verb.

In the above-mentioned method, there can be one or more noun, that is, there can be plural pieces of information about the articles. Practically, when radio tag reader simultaneously detects N tags, the conditional probability for a verb v is totalized by the following equation, the verb v for N nouns can be estimated.

$$P(\text{verb } v|\text{noun } n_1,\text{noun } n_2,\ldots,\text{noun } n_N) \propto 1/(\text{number of types of verbs})P(\text{noun } n_1|\text{verb } v)P(\text{noun } n_2|\text{verb } v)\ldots P(\text{noun } n_N|\text{verb } v)$$

"Simultaneously detecting" is not limited to the case where a plurality of radio tag IDs are detected with the same timing, for example, as in the case where a plurality of radio tag IDs are detected in ten seconds, there can be an allowance for a time length.

In the above-mentioned method, a conditional probability for a verb is totalized, but a weight can also be added. For example, depending on the position, etc. between an article and a user, a weight can be added to the noun of the article. In this case, when the weight of the noun $n_i$ (i=1, 2, ..., N) is $a_i$ (i=1, 2, ... N), the above-mentioned equation is expressed as follows.

$$P(\text{verb } v|\text{noun } n1,\text{noun } n_2,\ldots,\text{noun } n_N) \propto 1/(\text{number of types of verbs})a_1P(\text{noun } n_1|\text{verb } v)a_2P(\text{noun } n_2|\text{verb } v)\ldots a_NP(\text{noun } n_N|\text{verb } v)$$

(Designation of User)

As means for designating a user for performing an estimated activity, the information registered as a proprietor of, for example, a cellular phone, etc. can be used. That is, when the radio tag reader 20 is loaded into a cellular phone, and a radio tag ID is transmitted from the radio tag reader 20 to the activity estimation unit 30, the information about a user as a proprietor of the cellular phone can be transmitted together.

Furthermore, when a radio tag is also attached to a user, and the radio tag reader 20 simultaneously detects a radio tag ID of an article and the radio tag ID of the user, a user whose activity on the article can be designated.

(Other Examples of Configurations)

Figure 4:
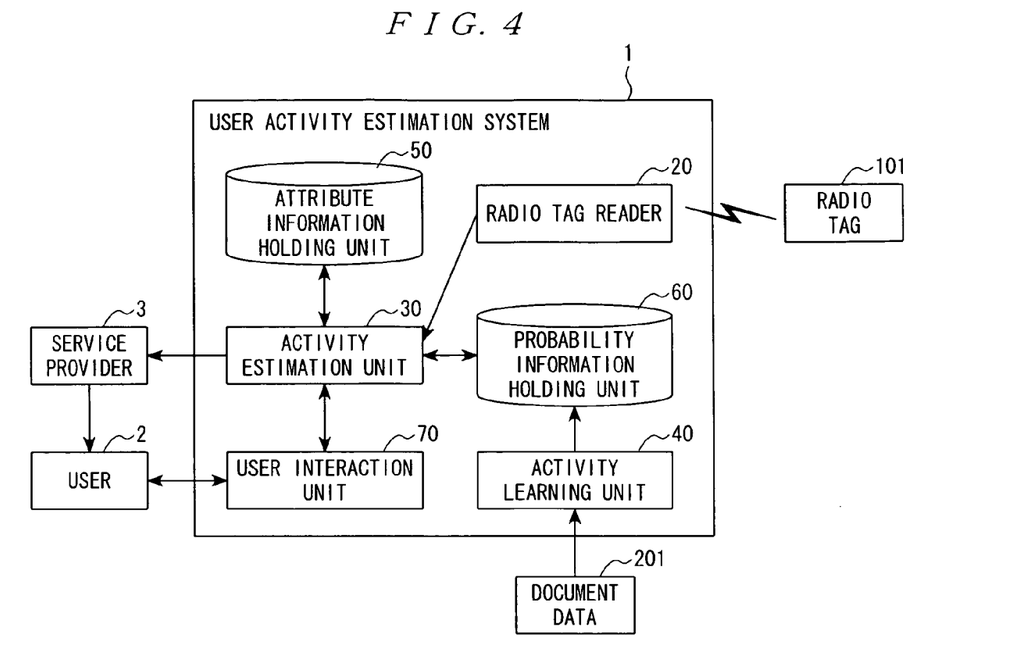
FIG. 4 is a block diagram showing another example of the configuration of the user activity estimation system according to a mode for embodying the present invention.

Next, other examples of the configuration of the user activity estimation system according to the mode for embodying the present invention are described below by referring to FIG. 4. As shown in FIG. 4, a user activity estimation system can be constituted by adding an activity learning unit 40 to the configuration shown in FIG. 1.

The activity learning unit 40 calculates a conditional probability from the relationship between a noun and a verb in a sentence after receiving input document data 201. A calculation result of the activity learning unit 40 is held in the probability information holding unit 60, thereby estimating a user activity with higher accuracy.

(Activity Learning Unit)

Figure 5:
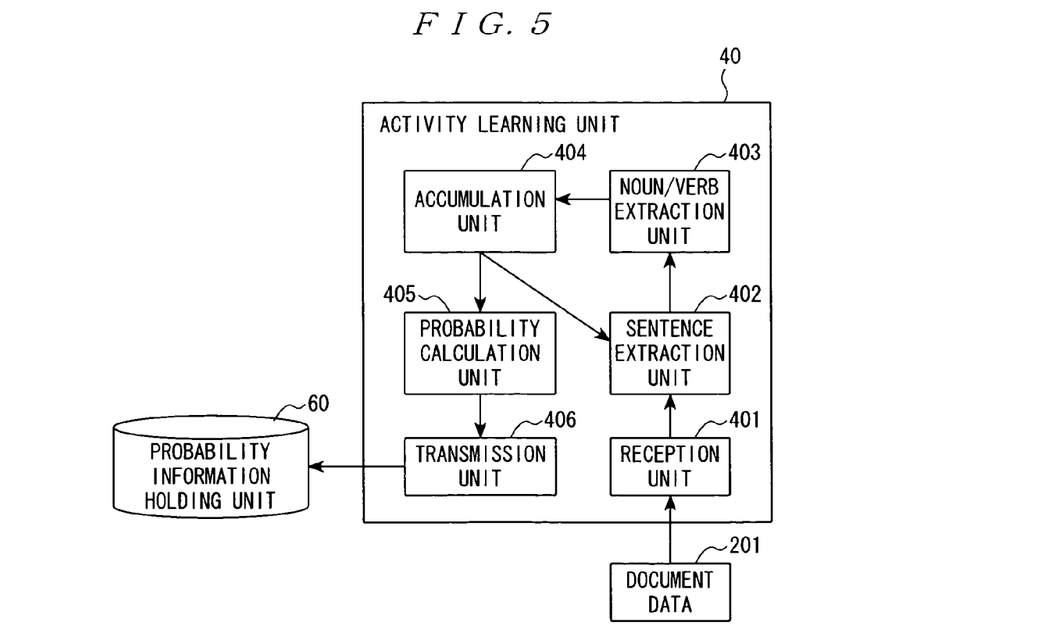
FIG. 5 is a block diagram showing a practical example of the configuration of the activity learning unit shown in FIG. 4.

FIG. 5 is a block diagram showing a practical example of the configuration of the activity learning unit 40 shown in FIG. 4. As shown in FIG. 4, the activity learning unit 40 is constituted by including: a reception unit 401 for inputting the document data 201; a sentence extraction unit 402 for performing a segmentation process for each sentence; a noun/verb extraction unit 403 for extracting a noun and a verb in a sentence; an accumulation unit 404 for accumulating the number of nouns and verbs; a probability calculation unit 405 for calculating the conditional probability of a noun to a verb; and a transmission unit 406 for transmitting a calculation result, etc. by the probability calculation unit 405.

With the above-mentioned configuration, when the document data 201 is input, the reception unit 401 receives the data, and transmits it to the sentence extraction unit 402. The sentence extraction unit 402 segments each sentence for the document data, and transmits each sentence to the noun/verb extraction unit 403.

The document data can be, for example, a document described on a Web page, etc., a document described in newspaper, or a document directly input by a user through a PC. The segmentation of a sentence from a document can be performed for a punctuation mark in the case of Japanese or a period mark in the case of English.

The noun/verb extraction unit 403 extracts all nouns and verbs in a segmented sentence, and the extracted nouns and verbs are transmitted to the accumulation unit 404.

The accumulation unit 404 accumulates the number of received nouns and verbs, the noun and the verb simultaneously appearing in a sentence, and the number of them, and requests the sentence extraction unit 402 to process the next sentence. For example, when there is a sentence "I wash dishes" as learning data, "dish" is extracted as a noun, and "wash" is extracted as a verb, and they and their correspondence are accumulated in the accumulation unit 404.

When the process of all sentences included in the document data is completely performed, the accumulation unit 404 requests the probability calculation unit 405 to calculate the conditional probability. At this time, the number of the nouns and verbs accumulated in the accumulation unit 404 and the number of the nouns and verbs simultaneously appearing in sentences are added up and transmitted to the probability calculation unit 405.

The probability calculation unit 405 calculates the conditional probability of a noun to a verb for all nouns and verbs by the following equation.

$P(\text{noun } n | \text{verb } v) = $ (total number of simultaneous appearance of a noun $n$ and a verb $v$)/(total number of verbs $v$ existing in learning data)

The learning method of obtaining a conditional probability can be the maximum likelihood learning and the posterior distribution maximum learning.

The transmission unit 406 transmits the calculated conditional probability and the number of types of verbs in the learning data to the probability information holding unit 60.

The configuration of the activity learning unit 40 explained above by referring to FIG. 5 is only an example of realizing the activity learning unit 40, and other configurations can be used. One of other examples can be the sentence extraction unit 402 transmitting all segmented sentences to the noun/verb extraction unit 403, and the noun/verb extraction unit 403 simultaneously extracting nouns and verbs from all received sentences and transmitting them to the accumulation unit 404. In this case, it is not necessary for the accumulation unit 404 to issue a request to the sentence extraction unit 402 as shown in FIG. 5.

Furthermore, as the relationship between the noun and the verb other than those simultaneously existing in a sentence, there is, for example, a method of calculating a control program with the connection between a noun and a verb considered.

(Activity Learning Method)

Figure 6:
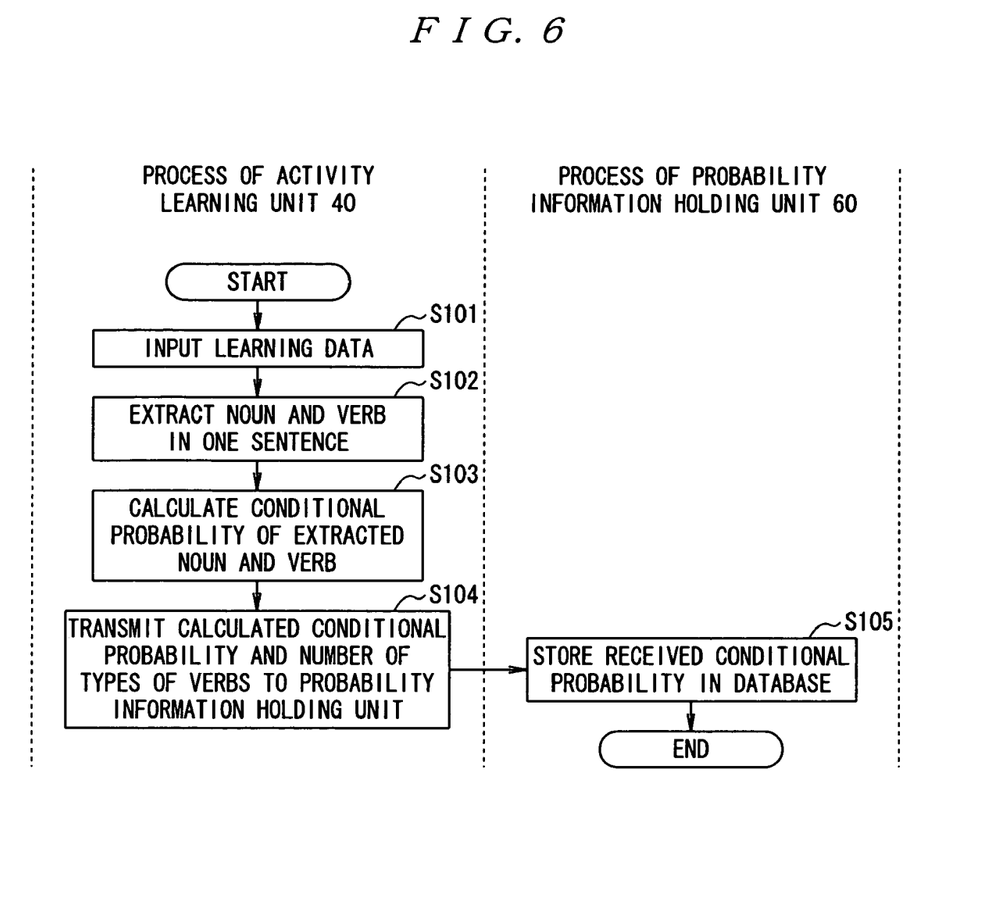
FIG. 6 is a flowchart of the computer learning method according to a mode for embodying the present invention.

FIG. 6 is a flowchart showing the process of the activity learning unit 40 in FIG. 5, that is, a flowchart showing an example of the process of an activity learning method. By referring to FIG. 6, when document data is input in step S101, the activity learning unit 40 extracts a noun and a verb in one sentence from document data in step S102. Then, in step S103, the activity learning unit 40 calculates the conditional probability between the extracted noun and verb. Then, the activity learning unit 40 transmits the calculated conditional probability and the number of types of verbs in step S104 to the probability information holding unit 60.

Upon receipt of the conditional probability and the number of types of verbs transmitted from the activity learning unit 40, the probability information holding unit 60 stores them in the database in step S105.

(Method of Providing Service for User)

Next, a method of providing a service for a user is explained below. As a method of providing a service for a user, there are a number of methods, for example, transmitting an estimation result to a service provider, presenting to a user a user activity estimation result for selection, allowing a service provider to generate a service list for selection by a user from the list, etc. These methods are explained below.

(Transmitting an Estimation Result to a Service Provider)

The activity estimation unit 30 transmits an estimation result about a user activity and the information about a designated user to the service provider 3. Thus, the service provider 3 can provide an appropriate service for a user depending on the estimation result. At this time, the activity estimation unit 30 can transmit one of the activities having the highest values in the estimation results to the service provider 3, or can transmit a plurality of estimation results as, for example, the results having the five highest values. Furthermore, a verb occupying the higher 90% of the estimation results to a noun can be transmitted.

Furthermore, a condition of a verb to be transmitted is received from the service provider 3 in advance, and only the verb satisfying the condition can be transmitted.

In addition, when data is transmitted to the service provider 3, not only a verb as an estimation result and the information about a designated user, the information about an article used in estimation can also be transmitted. Furthermore, a verb can be transmitted as is, and can be transmitted with the information about an article in a sentence form. For example, when the verb "wear" is estimated from the noun "jacket", the activity estimation unit 30 can transmit the information "wearing a jacket" to the service provider 3.

Figure 7:
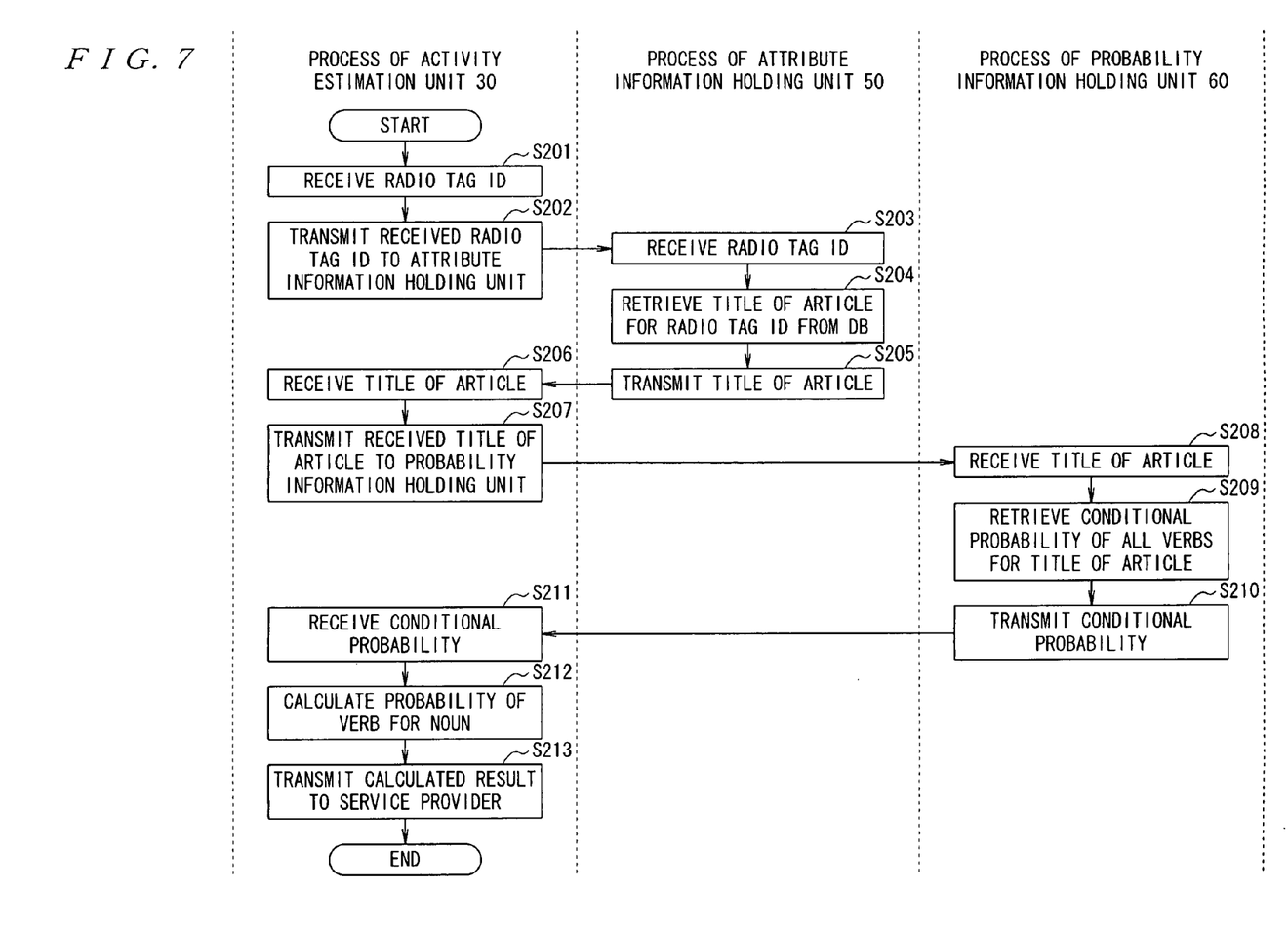
FIG. 7 is a flowchart showing an example of a service providing method by transmitting an estimation result to a service provider.

FIG. 7 is a flowchart showing an example of the service providing method by transmitting an estimation result to a service provider. By referring to FIG. 7, first, the activity estimation unit 30 receives a radio tag ID from a radio tag reader in step S201, and a received radio tag ID is transmitted to the attribute information holding unit 50 in step S202.

The attribute information holding unit 50 receives a radio tag ID in step S203. In step S204, the title of the article as the information about an article for a radio tag ID is retrieved from a database. Then, in step S205, the title of the article is transmitted to the activity estimation unit 30.

In step S206, the activity estimation unit 30 receives the title of an article. In step S207, the title of the received article is transmitted to the probability information holding unit 60. In step S208, the probability information holding unit 60 receives the title of the article. In step S209, the values of conditional probabilities of all verbs are retrieved from a database. Then, in step S210, the value of a conditional probability is transmitted to the activity estimation unit 30. The activity estimation unit 30 receives a conditional probability in step S211, and calculates the value of a probability of a verb for a noun in step S212. Then, in step S213, a calculation result is transmitted to the service provider 3 (refer to FIG. 1) as an activity estimated by a user.

(Presenting a User Activity Estimation Result to a User for Selection)

The activity estimation unit 30 can also present to a user an estimation result through the user interaction unit 70. In this case, a user selects the value closest to the current situation from the presented estimation result. The activity estimation unit 30 transmits a result of the selection by the user to the service provider as the current situation, and the service provider 3 offers a service depending on the situation. Thus, an appropriate service depending on the status of a user can be provided.

For example, as a candidate for a user activity to "dish", an estimation result of "wash" and "serve" is obtained. Finally, the user selects the status, thereby possibly offering a service depending on the situation of washing the dishes or arranging the dishes as compared with the case of uniquely designating a user activity.

Figure 8:
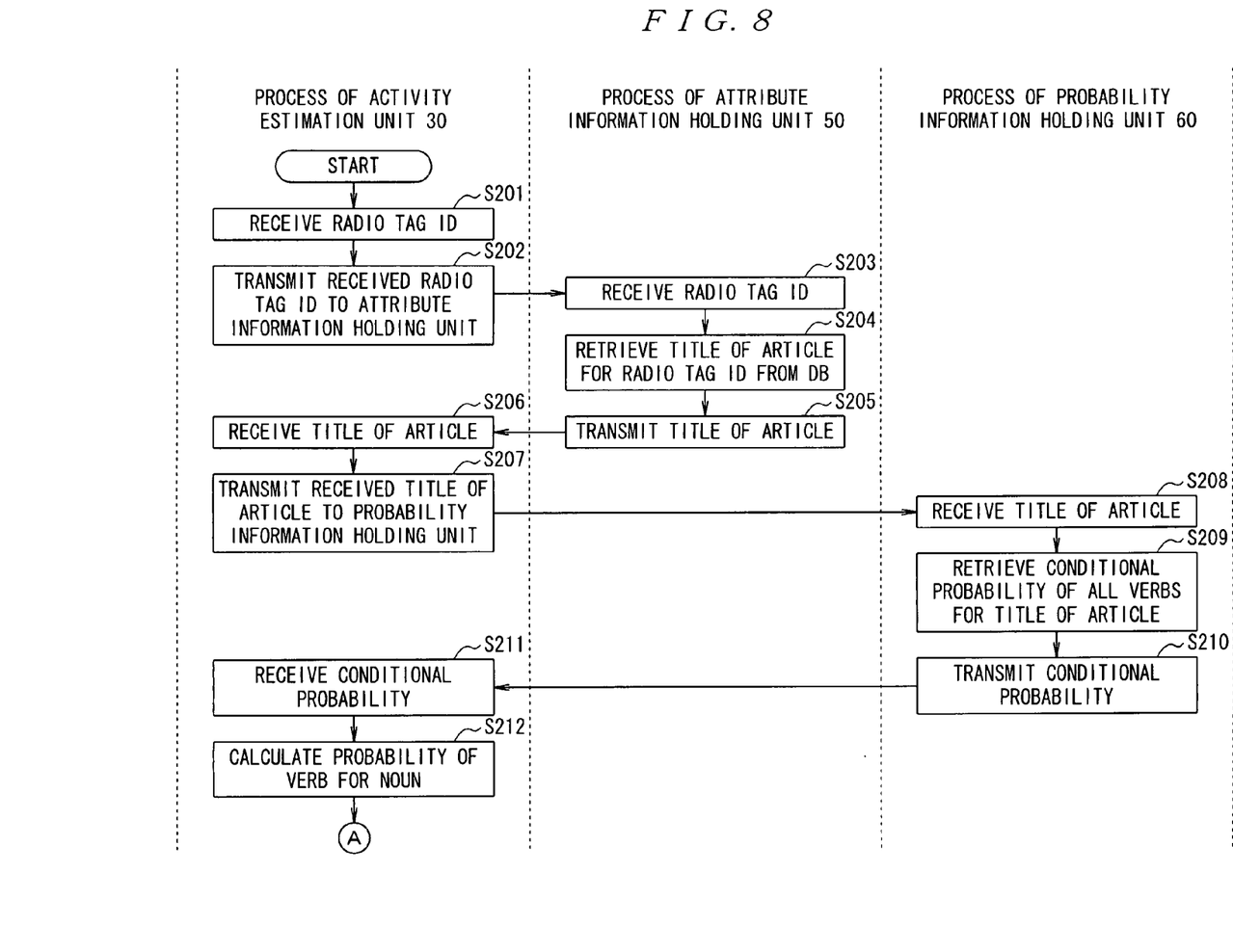
FIG. 8 is a flowchart showing an example of a service providing method by presenting a user activity estimation result to a user and allowing the user to make a selection.
Figure 9:
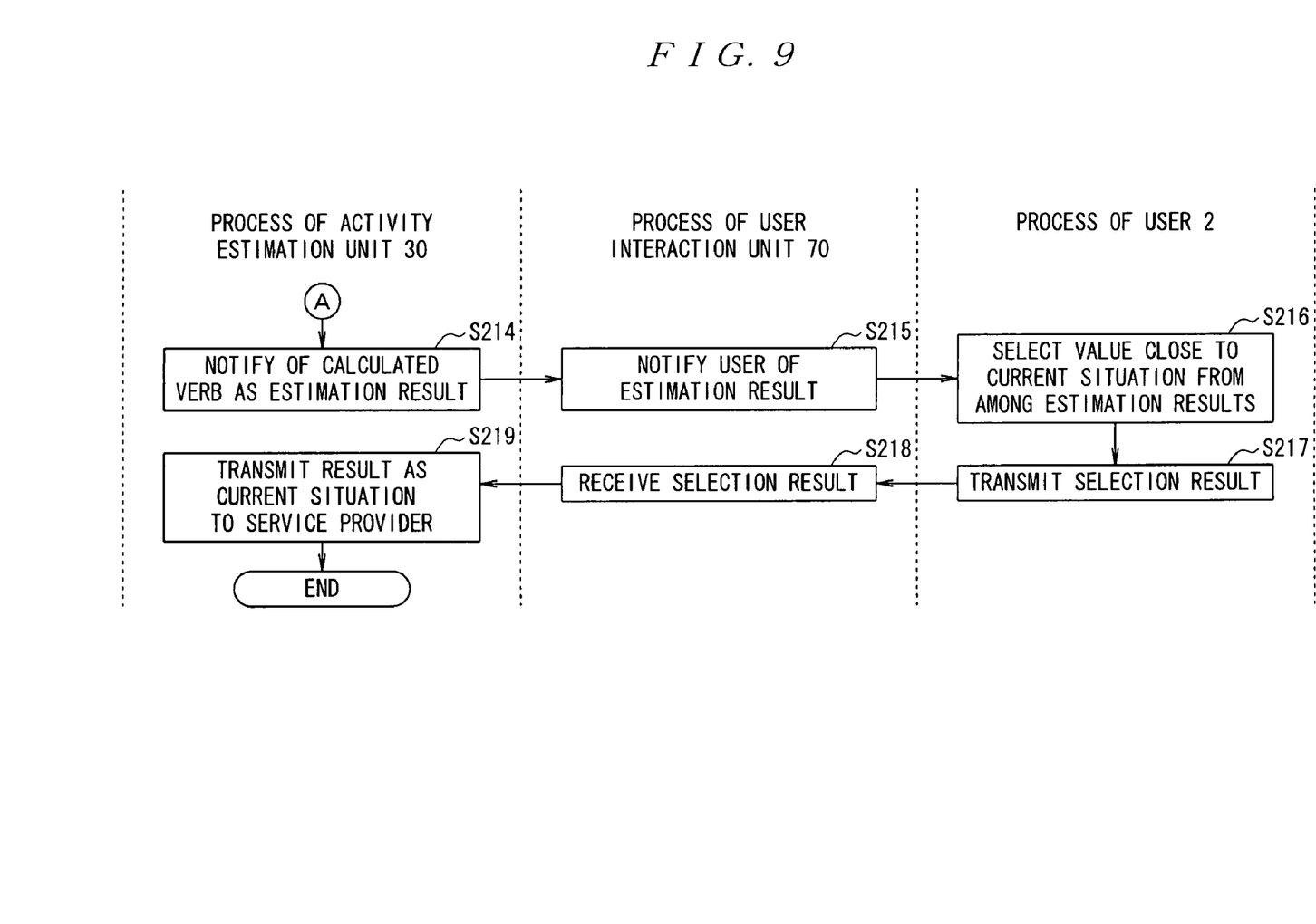
FIG. 9 is a continued flowchart showing an example of a service providing method by presenting a user activity estimation result to a user and allowing the user to make a selection.

FIGS. 8 and 9 are flowcharts showing examples of a service providing method by presenting a user activity estimation result to a user. In FIG. 8, the processes from steps S201 to step S212 are the same as the contents of the process explained by referring to FIG. 7.

In step S214 shown in FIG. 9, the activity estimation unit 30 notifies the user 2 of a calculated verb as an estimation result. In step S215, the user interaction unit 70 notifies a user of an estimation result.

Upon receipt of a notification of an estimation result, the user 2 selects a value close to the current situation from among the values of the estimation results in step S216, and transmits the selection result to the present system in step S217. In step S218, the user interaction unit 70 receives a user selection result, and transmits it to the activity estimation unit 30. In step S219, the activity estimation unit 30 receives the selection result, and transmits the result as the current situation to the service provider.

(Allowing a User to Select a Service from a Service List)

The activity estimation unit 30 presents the estimation result to the service provider 3, and acquires a list of the currently available services from the estimated activities. Then, the service list is presented to a user through the user interaction unit 70, and the user selects a desired service. When the activity estimation unit 30 receives a user-selected service through the user interaction unit 70, it notifies the service provider of a request to receive the service.

For example, when the estimation candidates "wash", "serve", and "dry" are acquired as the candidates for a user activity to "dish", and there is no service for "dry" as a result of a request to the service provider 3, the activity estimation unit 30 acquires a list of services available for "wash" and "serve" from the service provider, and presents to the user a service list about "wash" and "serve" through the user interaction unit 70. The user can receive the service by selecting a service to be received after the consideration of the current situation.

Figure 10:
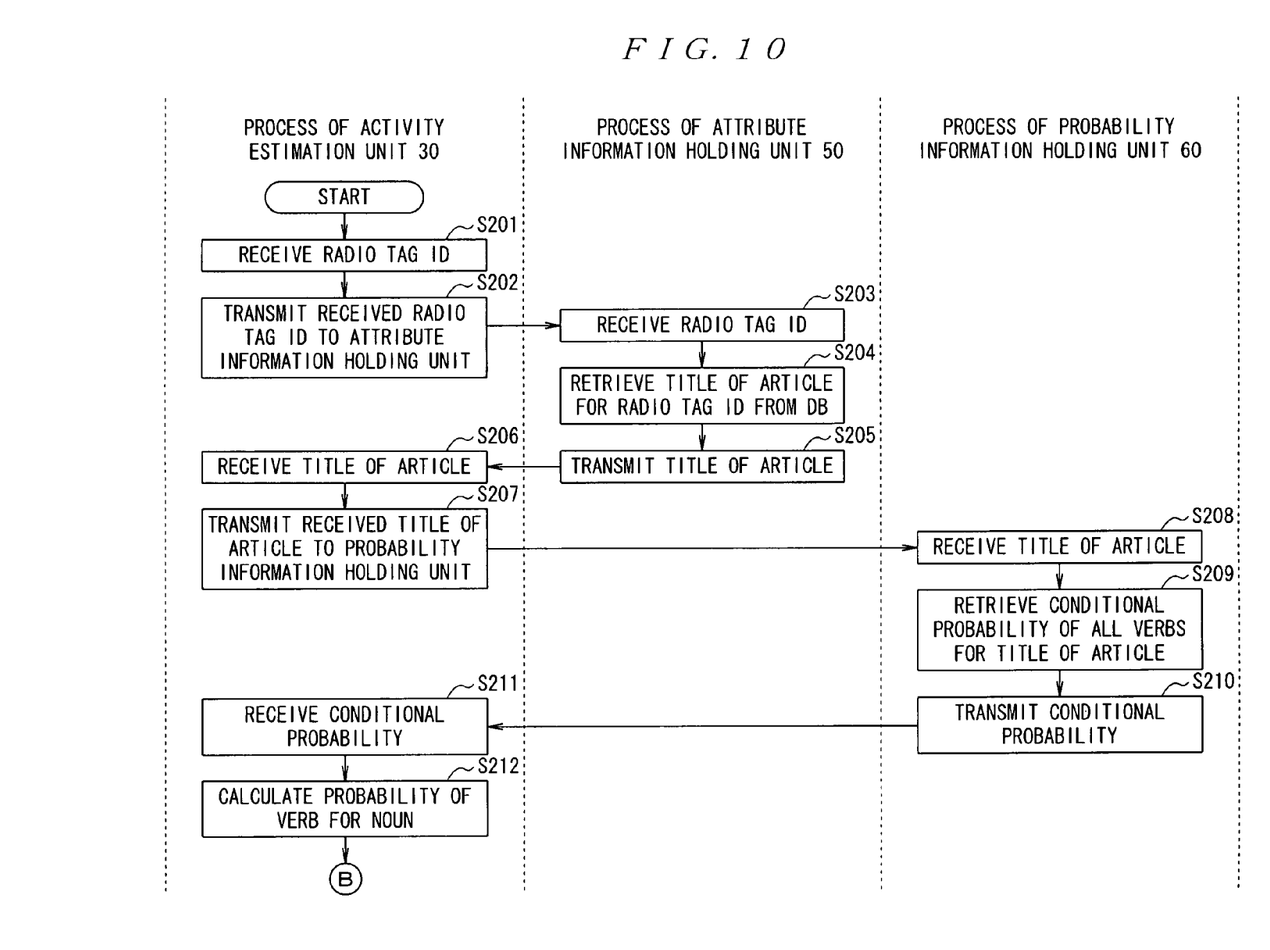
FIG. 10 is a flowchart showing an example of a service providing method by presenting a user activity estimation result to a user and allowing the user to make a selection.
Figure 11:
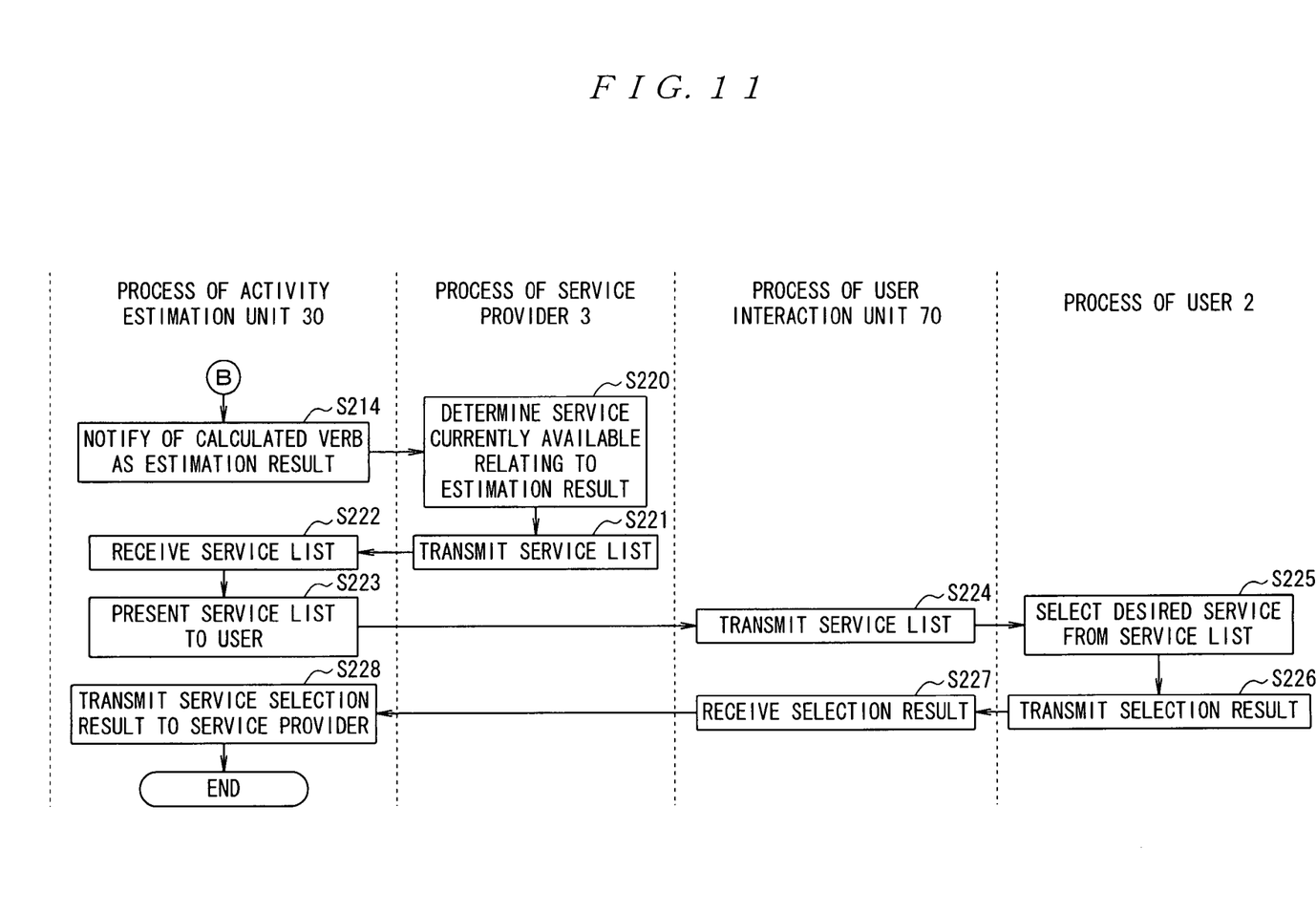
FIG. 11 is a continued flowchart showing an example of a service providing method by presenting a user activity estimation result to a user and allowing the user to make a selection.

FIGS. 10 and 11 are flowcharts showing examples of a service providing method by allowing a service provider to generate a service list and allowing a user to select a service from the list. In FIG. 10, the processes in steps S201 to S212 are the same as the processes explained above by referring to FIG. 7.

In step S214 shown in FIG. 11, the activity estimation unit 30 notifies the service provider 3 of a calculated verb as an estimation result. Upon receipt of the notification, the service provider 3 determines a service which can be currently offered on the estimation result in step S220, and transmits a service list to the activity estimation unit 30 in step S221.

The activity estimation unit 30 receives a service list in step S222, and transmits the service list to the user 2 in step S223. In step S224, the user interaction unit 70 transmits the service list to the user 2.

Upon receipt of the service list, the user 2 selects a service to be received from the service list in step S225, and transmits a selection result to the activity estimation unit 30 in step S226. In step S227, the user interaction unit 70 receives a service selection result of the user, and transmits it to the activity estimation unit 30. In step S228, the activity estimation unit 30 notifies the service provider 3 of a service selection result.

(User Activity Estimating Method)

In the above-mentioned user activity estimation system, the following user activity estimating method is realized. That is, a user activity estimating method for estimating a user activity from an article to which an article identifier for identification of an article is attached, including: an attribute information holding step (for example, corresponding to step S202 shown in FIG. 7) of holding the article identifier associated with article information; a probability information holding step (for example, corresponding to step S207 shown in FIG. 7) of holding a relationship between a noun relating to the article information and a verb relating to the article associated with a conditional probability in probability information holding means (for example, corresponding to the probability information holding unit 60 shown in FIG. 1); and an activity estimating step (for example, corresponding to step S212 shown in FIG. 7) of estimating a user activity upon detection of the article identifier based on contents held in the probability information holding means is realized.

In the above-mentioned method, based on the detection result of an identifier attached to an article, the user activity on the article can be estimated. Therefore, an appropriate service can be embodies depending on the user activity. Furthermore, a user activity can be estimated by a less expensive system without using an expensive device such as a sensor, etc. to be attached to a user.

Furthermore, in the above-mentioned user activity estimation system, the following user activity estimating method is realized. That is, a user activity estimating method for estimating a user activity from an article to which an article identifier for identification of an article is attached, including: an attribute information holding step (for example, corresponding to step S202 shown in FIG. 7) of holding the article identifier associated with article information; a probability information holding step (for example, corresponding to step S207 shown in FIG. 7) of holding a relationship between a noun relating to the article information and a verb relating to the article associated with a conditional probability in probability information holding means (for example, corresponding to the probability information holding unit 60 shown in FIG. 1); a learning step (for example, corresponding to step S104 shown in FIG. 6) of holding a result of learning a relationship between the noun and the verb relating to a user activity; and an activity estimating step (for example, corresponding to step S212 shown in FIG. 7) of estimating a user activity upon detection of the article identifier based on contents held in the probability information holding means is realized.

In the above-mentioned method, the contents of the probability information holding means can be updated depending on the learning result, thereby enhancing the estimation probability of a user activity.

(Conclusion)

In the above-mentioned user activity estimation system and user activity estimating method according to the mode for embodying the present invention, it is estimated that a user is taking any activity on an article from the detection result of the identifier attached to the article, and the user activity on the article can be estimated. Practically, a noun and a verb can be mapped as the information about an article and the user activity in the reality, and the user activity is estimated according to the information about the article based on the relationship between the noun and the verb. By estimating the user activity according to the information about an article, an appropriate service can be offered depending on the user activity.

For example, when a user detects a radio tag ID attached to a jacket using a cellular phone into which a radio tag reader is loaded, "wear" is calculated as one of the verbs estimated from the noun "jacket". Therefore, the service provider can estimate that the user is to wear the jacket, and can provide a fashion advice service for the user.

Furthermore, when a radio tag ID attached to a detergent is detected, "wash" is calculated as one of the verbs estimated from the noun "detergent". Therefore, the service provider can estimate that the user is to do a wash, check the contents of a washing machine, and give a warning when an article which cannot be washed in the washing machine is included in the contents.

The present invention can be used when a user activity is to be estimated from the relationship between a noun and a verb relating to an article to which the identifier is attached.

What is claimed is:

1. A computer readable medium storing a program for estimating a user activity from an article to which an article identifier for identification of the article is attached, the program executing instructions to perform the steps comprising:

extracting a noun and a verb in a sentence from document data that have been input;

calculating a conditional probability of the verb to the noun in accordance with P (verb v|noun n)∝1/(a number of types of verbs)P(noun n|verb v);

storing an article identifier and in association with article information corresponding to the noun;

storing probability information in association with the noun and the verb that have been extracted, the conditional probability that has been calculated, and the number of the types of the verbs;

detecting an article identifier; and estimating the user activity based on the probability information, in response to detection of the article identifier;

wherein when a plurality of the verbs are associated with the noun, a plurality of the conditional probabilities of the plurality of the verbs are compared with each other, the estimating step estimates that there is a higher possibility that the user will perform the user activity corresponding to the verb having a higher conditional probability.

2. The computer readable medium according to claim 1, wherein:

in the estimating the user activity, the noun is replaced with the article information corresponding to the article identifier, and the verb is replaced with the user activity based on an association between the noun and the verb.

3. The computer readable medium according to claim 1, further comprising:

interacting with a user to present the estimated user activity to the user;

wherein when the user selects the estimated user activity that is close to a current user activity of the user, the conditional probability is changed based upon the estimated user activity selected by the user.

4. The computer readable medium according to claim 1, wherein the estimating the user activity based on the probability information includes:

acquiring the article information stored in association with the article identifier;

acquiring the noun corresponding to the article information and the conditional probabilities of all the verbs associated with the noun; and estimating the verb to the noun acquired.

5. A user activity estimating method for estimating a user activity from an article to which an article identifier for identification of the article is attached, the method comprising:

extracting a noun and a verb in a sentence from document data that have been input;

calculating a conditional probability of the verb to the noun in accordance with $P(\text{verb } v|\text{noun } n) \propto 1/(\text{a number of types of verbs}) P(\text{noun } n|\text{verb } v)$;

storing an article identifier and in association with article information corresponding to the noun;

storing probability information in association with the noun and the verb that have been extracted, the conditional probability that has been calculated, and the number of the types of the verbs;

detecting an article identifier; and estimating the user activity based on the probability information, in response to detection of the article identifier;

wherein when a plurality of the verbs are associated with the noun, a plurality of the conditional probabilities of the plurality of the verbs are compared with each other, the estimating step estimates that there is a higher possibility that the user will perform the user activity corresponding to the verb having a higher conditional probability;

wherein the above steps are performed by a computer.

* * * * *